(No Model.)

M. LUDWIG.
CHOPPING KNIFE.

No. 443,600. Patented Dec. 30, 1890.

Witnesses
Samuel Ker
H. F. Riley

Inventor
Mary Ludwig
By her Attorneys,
C. A. Snow & Co.

UNITED STATES PATENT OFFICE.

MARY LUDWIG, OF BUCYRUS, OHIO.

CHOPPING-KNIFE.

SPECIFICATION forming part of Letters Patent No. 443,600, dated December 30, 1890.

Application filed June 27, 1890. Serial No. 356,989. (No model.)

*To all whom it may concern:*

Be it known that I, MARY LUDWIG, a citizen of the United States, residing at Bucyrus, in the county of Crawford and State of Ohio, have invented a new and useful Chopping-Knife, of which the following is a specification.

The invention relates to improvements in chopping-knives.

The object of the present invention is to provide a simple and inexpensive chopping-knife adapted to be continually used without liability of becoming choked, and capable of having its blades readily removed for sharpening or other purposes.

The invention consists in the construction and novel combinations and arrangement of parts, hereinafter fully described, illustrated in the accompanying drawings, and pointed out in the claim hereto appended.

Figure 1:
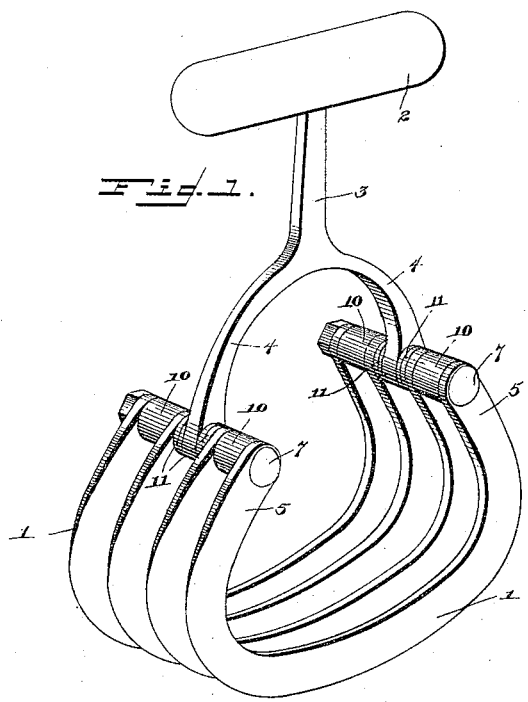
Figure 2:
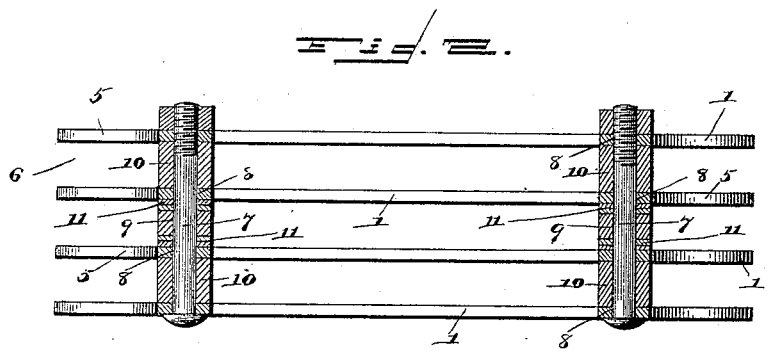

In the drawings, Figure 1 is a perspective view of a chopping-knife constructed in accordance with this invention. Fig. 2 is a horizontal sectional view.

Referring to the accompanying drawings, 1 designates the blades of a chopping-knife, which is provided with a handle 2, that is secured to a shank or stem 3, which is provided with diverging arms 4, to which are connected the ends of the blades 1. The blades 1 are curved and are approximately U-shaped, and have upwardly-extending sides 5, which are inwardly inclined, and are arranged in series and separated by spaces 6, and they have all their adjacent ends connected by a single bolt 7, which passes through perforations 8 of the blades and an eye or perforation 9 of the diverging arm 4 of the stem 3. The blades have their ends separated by spacing-sleeves 10, which are arranged upon the bolt, and their inner pair of blades are separated by the end of the arm 4 and washers or rings 11 arranged at each side of the arm.

By constructing the blades of narrow metal and forming them approximately U-shaped and spacing them, the power and depth of cutting is increased, the cutting-edge is greatly enlarged, the knife is prevented from clogging, and is made self-cleaning.

It will readily be seen that it is impossible for the spaces between the blades to become choked with the material or food operated upon, and that the blades can be readily removed for the purpose of sharpening, when desired.

From the foregoing description and the accompanying drawings the construction, operation, and advantages of the invention will readily be understood.

What I claim is—

A chopping-knife comprising the approximately U-shaped blades arranged in series and separated by spaces and having upwardly-extending sides which are inwardly inclined and are provided with perforations, the bolts 7, passing through the perforations and connecting all the adjacent ends of the blades, the spacing-sleeves arranged upon the bolts and separating the blades, the stem 3, having the divergent arms provided with perforations to receive the bolt and adapted to separate and space the blades, and the handle secured to the stem, substantially as described.

In testimony that I claim the foregoing as my own I have hereto affixed my signature in presence of two witnesses.

MARY LUDWIG.

Witnesses:
   L. C. FEIGHNER,
   C. T. LUDWIG.